Feb. 27, 1962 G. M. PAVEY, JR 3,022,852
MEANS FOR PRODUCING A LOW FREQUENCY SEISMIC SIGNAL
Filed April 8, 1958 6 Sheets-Sheet 1
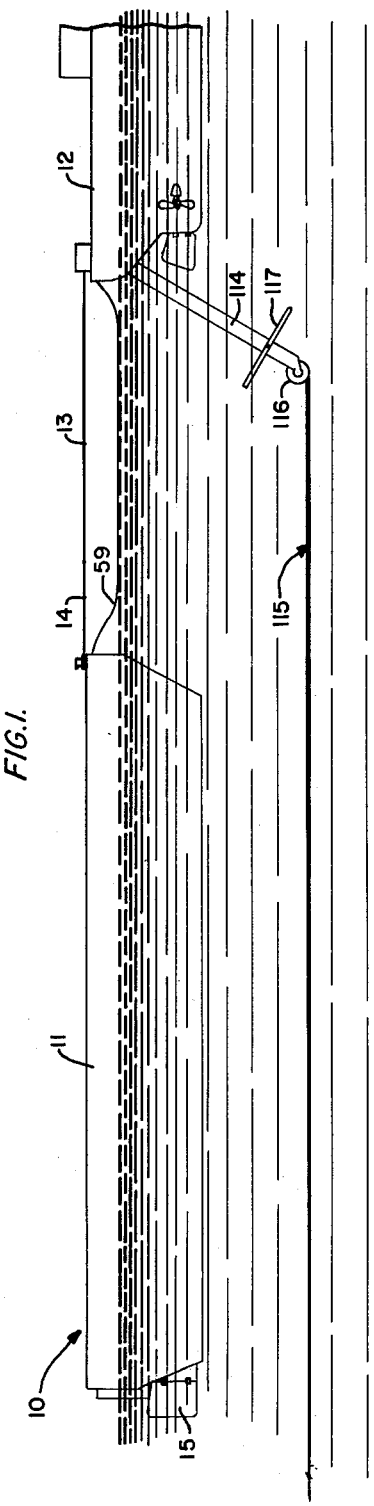
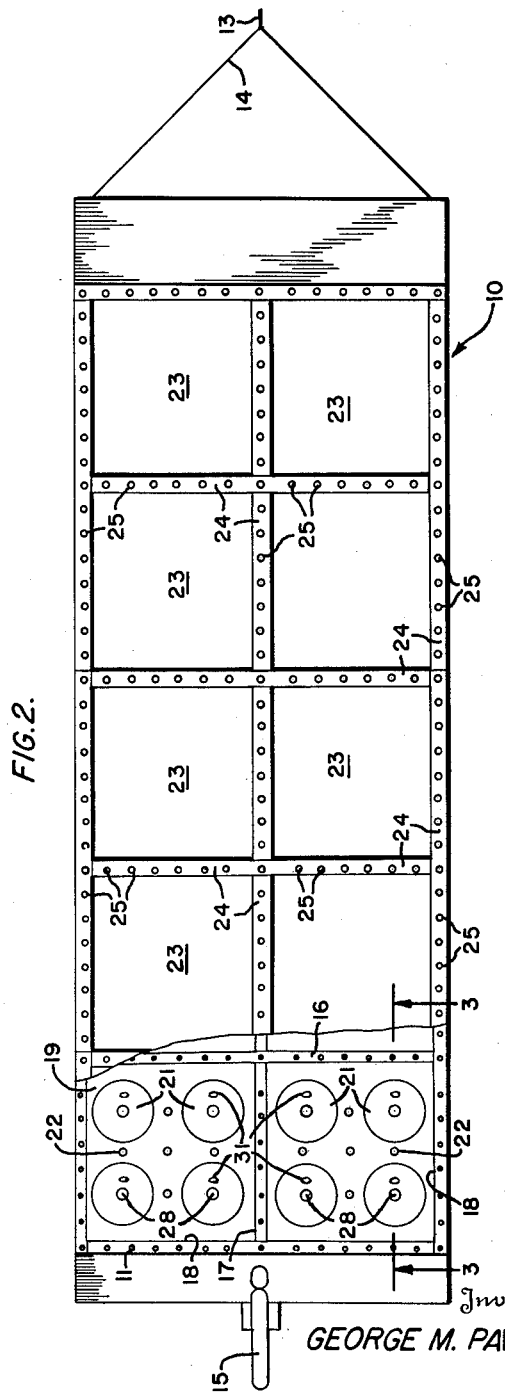
Inventor.
GEORGE M. PAVEY JR.
By
Attorney Feb. 27, 1962    G. M. PAVEY, JR    3,022,852
MEANS FOR PRODUCING A LOW FREQUENCY SEISMIC SIGNAL
Filed April 8, 1958    6 Sheets-Sheet 2

Inventor.
GEORGE M. PAVEY JR.
By
Attorney

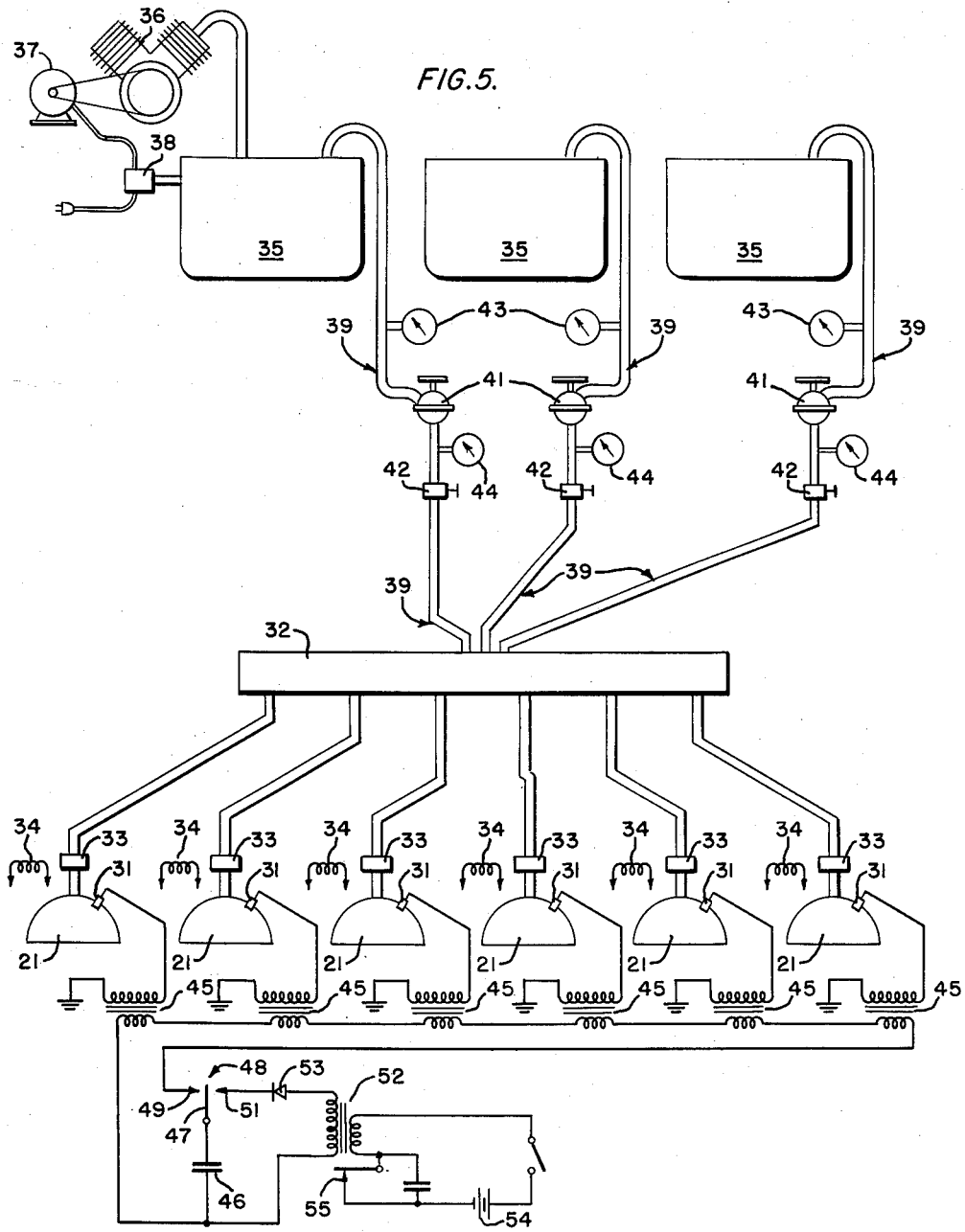

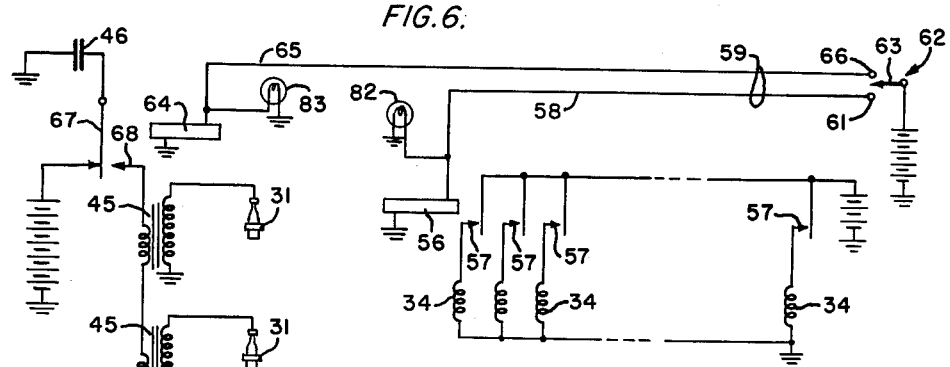
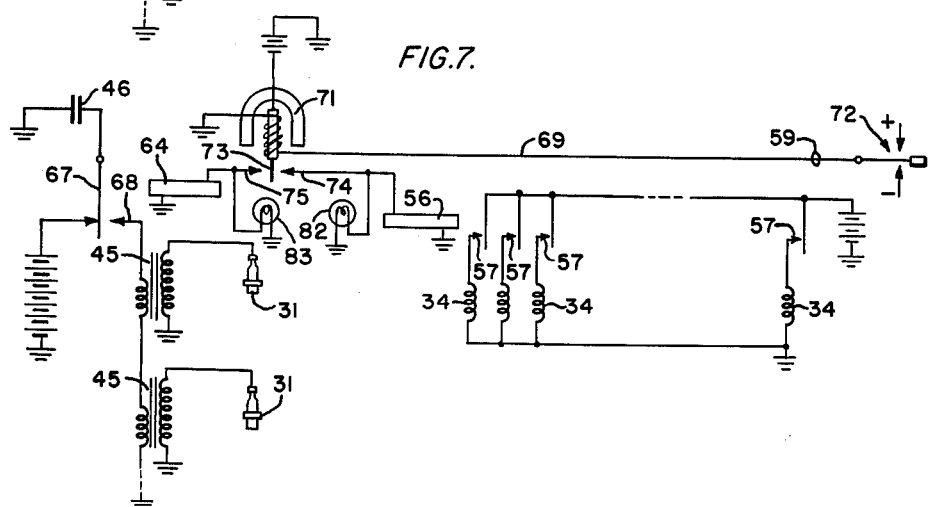
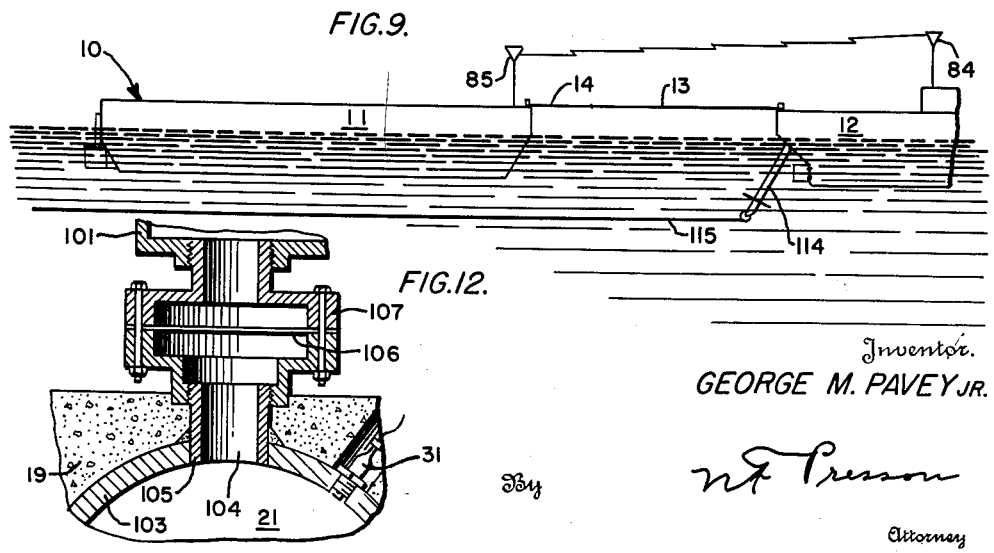

Feb. 27, 1962 G. M. PAVEY, JR 3,022,852
MEANS FOR PRODUCING A LOW FREQUENCY SEISMIC SIGNAL
Filed April 8, 1958 6 Sheets-Sheet 5

Inventor.
GEORGE M. PAVEY JR.

By W F Presson
Attorney

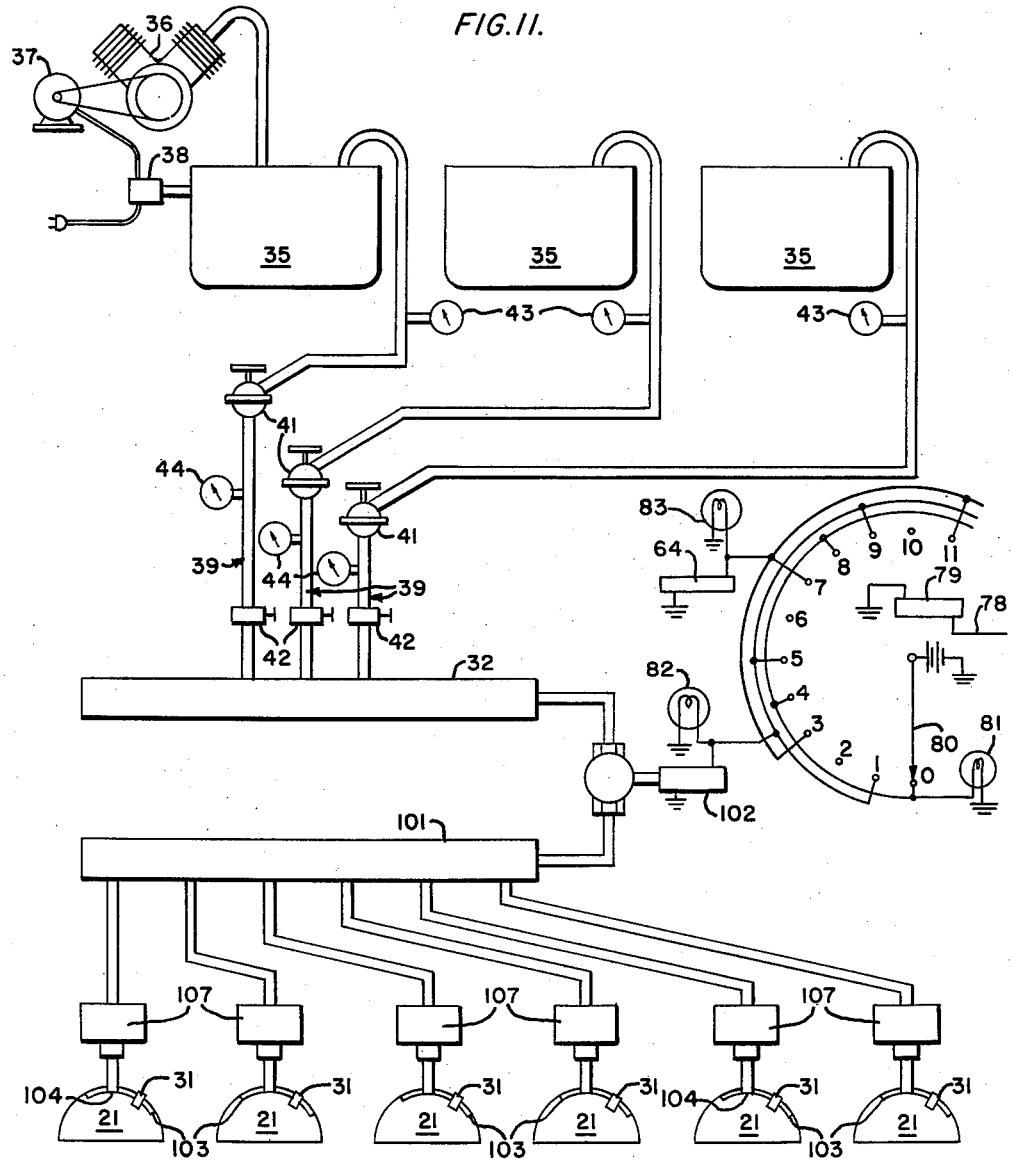

United States Patent Office 3,022,852
Patented Feb. 27, 1962

3,022,852
MEANS FOR PRODUCING A LOW FREQUENCY SEISMIC SIGNAL
George M. Pavey, Jr., Dallas, Tex., assignor to Marine Research Company, Dallas, Tex.
Filed Apr. 8, 1958, Ser. No. 727,089
18 Claims. (Cl. 181—.5)

This invention relates to means for propagating an underwater impulse forming a seismic signal and more particularly to a system having means for efficiently producing subaqueously a low frequency high intensity sound pressure wave over a large area corresponding generally to the water contact area of the wave generating means and which is of a size comparable to the wave length of the sound wave generated thereby.

In devices for producing a seismic wave for underwater geophysical prospecting heretofore devised it has been the usual practice to employ a quantity of explosive material such, for example, as dynamite and nitro carbo nitrate, contained within a cartridge or casing and fired beneath the water in predetermined spaced relation with respect to the seismic spread. Such devices possess several disadvantages, one of which, obviously, is the necessity for replacement of the explosive cartridge after each shot and the problems incident to establishing a firing circuit to each of the cartridges in successive order whenever another cartridge is to be fired. Such an arrangement is costly in operation particularly when a large number of shots are to be fired. Furthermore, when the explosive shot emanates from a point source as is the case with the explosive cartridge arrangement, the efficiency of the generated wave is low for the reason that the rate of changes of pressure and the duration of the pressure peak do not correspond to the frequency most favorable to seismic wave propagation. It has been found necessary in the use of these prior devices to employ relatively large quantities of explosives to effect deep penetration of the seismic wave within the subaqueous geological formation by reason of the undesired frequencies and inefficient character of the wave thus produced.

The device of the present invention posssses all of the advantages of the prior art devices and none of the foregoing disadvantages.

In accordance with the present invention this desirable result is achieved by initiating the seismic impulses from the flat bottom of a barge having a plurality of downwardly opening combustion chambers formed therein by means of which the seismic impulse is generated when a combustible gaseous mixture within the chambers is ignited. A low frequency sound pressure wave is thus suddenly applied to the water interface abutting the lower bottom portion of the barge over a large area whereby a substantially plane wave having good radiation resistance and directional characteristics is generated and the wave is devoid of large energy components outside the useful band of frequencies. This may be achieved by igniting the explosive gases within the chambers either simultaneously or in slightly delayed time relation according to a predetermined pattern, as the case may be. A flexible diaphragm is preferably employed to exclude the water from each of the chambers and to transmit to the water the seismic impulses resulting from the burning gas mixture. Downward movement of the diaphragm in response to the pressure suddenly developed within the chambers opens a plurality of upwardly extending ports to allow the burned gas mixture to escape.

One of the objects of the present invention is to provide new and improved means for initiating a low frequency underwater seismic impulse.

Another object is to provide means for initiating an underwater seismic impulse simultaneously from a plurality of closely spaced sources to effect a seismic wave of improved directional characteristics having a preponderance of energy components within the useful band of frequencies.

Still another object is to provide means for initiating an underwater seismic impulse from a plurality of closely spaced gas filled sources to effect a low frequency wave in which the gas charges within the sources are fired in closely spaced time delayed relation according to a predetermined firing order.

A further object is to provide a new and improved source of low frequency underwater seismic signals in which the signals are initiated over a large area comparable in size to the wave length of the sound wave produced thereby.

A still further object is to provide a source of underwater seismic signals from a gaseous medium having a low detonation rate whereby the generated waves are of a low frequency character particularly suitable for seismic purposes.

Still another object is the provision of new and improved means for altering at will the shape of the wave front of the seismic signal to achieve a substantially plane wave and thereby to improve the directive characteristic thereof.

Still other objects, advantages, and improvements will be apparent from the following description taken in connection with the accompanying drawings of which:

FIG. 1 is a diagrammatic view in elevation of the present invention in accordance with a preferred embodiment thereof;

FIG. 2 is a bottom view somewhat enlarged and partially broken away of the low frequency acoustic signal generating device of FIG. 1;

FIG. 5 is a diagrammatic view of a gaseous fuel supply system suitable for use with the present invention and the ignition means therefor;

FIG. 6 is a schematic diagram of an electrical system for controlling the firing cycles of the low frequency signal generator at a distance;

FIG. 7 is a schematic diagram of an alternative form of electrical system for controlling the firing of the low frequency signal generator at a distance;

FIGS. 9 and 10 are views on which is shown a system for radio control of the electrical circuit arrangement of FIG. 8;

FIG. 11 is a view on which is shown an alternative method of charging the chambers with an explosive gas mixture;

FIG. 12 is a view in section and somewhat enlarged of the means for preventing flash back into the manifold when poppet valves are not employed.

Figure 3:
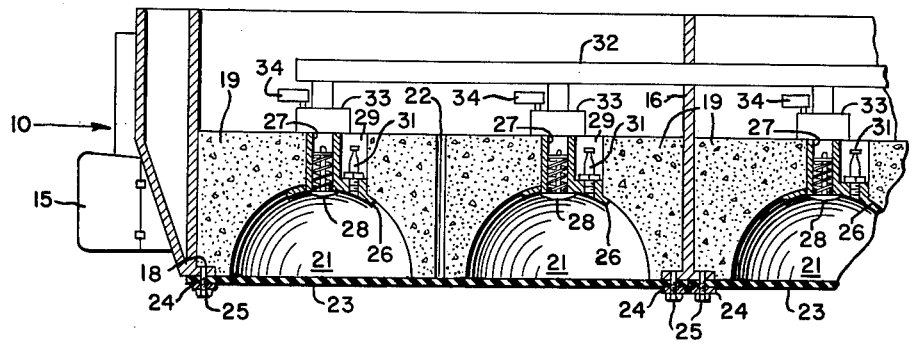
FIG. 3 is a sectional view, somewhat enlarged, of three combustion chambers and the charging and firing means therefor taken along the line 3—3 of FIG. 2.
Figure 4:
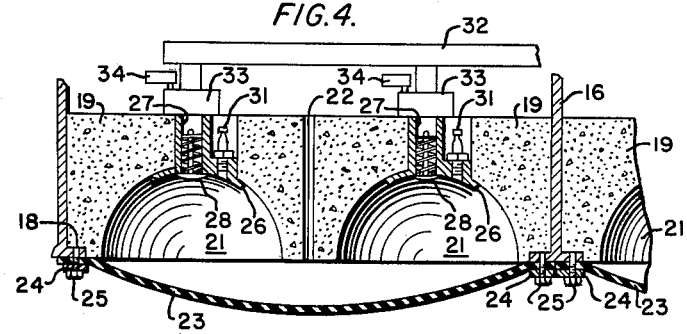
FIG. 4 is a view similar to FIG. 3 on which are shown two elements of the low frequency sound generator during a firing operation.

Referring now to the drawings on which like numerals of reference are employed to designate like or similar parts throughout the several views, and more particularly to FIG. 1 thereof, there is shown thereon a low frequency acoustic signal generator for seismic signals suitable for underwater geophysical prospecting indicated generally by the numeral 10 and comprising a barge 11 adapted to be towed by a vessel 12 as by the tow line 13 and bridle connection 14 illustrated. A rudder 15 carried by the barge is preferably employed in conjunction with the bridle to prevent yawing of the barge during the towing operation. The walls of the barge are composed of steel plates riveted or welded together, as is well known in the art of shipbuilding, and provided with a plurality of reinforcing members 16 and 17 secured to the side and end walls thereof and to each other substantially as shown. The lower portion of the end and side wall plates are formed inwardly as at 18, FIGS. 2 and 3, to provide a generally L-shaped support for a plurality of massive concrete blocks or slabs 19 which are supported thereby and by the members 16 and 17 upon which they rest in watertight relation with respect to the side and end walls of the barge.

Whereas the bottom of the barge has been shown on the drawings as comprising a plurality of slab or block sections interfitted in water tight relation with respect to each other and the side and end walls of the barge it will be understood that this has been done for the purpose of illustration and that the bottom may, if desired, be composd of a single slab of concrete.

The concrete bottom is provided with a plurality of explosive chambers 21 of semicircular or parabolic configuration formed therein in such manner that the open end of each of the chambers faces downwardly. Each of the chambers may be in the order of 18"–24" in diameter and mutually spaced substantially as shown. When employed with a barge of approximately 125 feet in length and have a beam of 80 feet, for example, the concrete bottom may conveniently comprise a plurality of slab sections, each having a horizontal surface area in the order of 15' to 20' placed edge-to-edge and secured to the barge in the manner aforesaid. Each of these slab sections comprises a plurality of uniformly spaced combustion chambers 21 in such manner that the lower surface of the assembled slab sections has the general appearance of a checkered or mottled mosaic, FIG. 2.

There is also provided within the concrete blocks intermediate the combustion chambers a plurality of exhaust ducts 22 through which the burned products of combustion are discharged thereby to facilitate scavenging of the chambers and prevent sustained oscillations of the burned gas as a bubble.

The bottom portion of each of the combustion chambers is normally sealed by a flexible diaphragm 23 composed of rubber of any of the synthetic varieties thereof suitable for the purpose and secured in watertight relation to the side and end walls of the barge and to the reinforcing members 16 and 17 carried thereby. This may be achieved in any suitable manner as by a plurality of metallic clamping strips 24 which maintain the edge portion of the diaphragms in watertight connection therewith when the bolts 25 passing therethrough are tightened. Each diaphragm may conveniently be of a size corresponding generally to the longitudinal and lateral dimensions of the concrete slab with which it coacts to transmit the low frequency sonic impulses to the water in response to combustion of the gaseous fuel within the chambers and to seal the exhaust ducts 22 when combustion has been complete and again when the combustion chambers have been scavenged, as will more fully appear as the description proceeds.

Securely fitted to the upper portion of each of the combustion chambers is an iron casting or plate member 26 having an inlet port 27 normally closed by a poppet valve 28 and a well 29 tapped at the lower wall thereof to receive a spark plug 31, FIG. 3. Each of the inlet ports 27 is in communication with a mixture mixing manifold 32 by way of a normally closed solenoid operated valve 33 adapted to be actuated to open position by the solenoid element 34 in response to an operating current applied thereto.

The source and means for supplying the combustible mixture of fuel gases to the manifold 32 will best be understood by reference to FIG. 5 on which is shown a complete fuel supply system for the combustion chambers 21. A fuel satisfactory for use in the system of the present invention has been found to comprise a mixture of air, acetylene and butane, although other gases suitable for the purpose may, if desired, be employed. Each of the fluid constituents, air, acetylene and butane comprising the preferred gaseous mixture, is contained within a separate sealed high pressure tank designated 35, 36 and 37 respectively, prior to the mixing of the constituents. Pressure of the air within tank 35 is achieved by a pressure pump 36 connected thereto and driven by an electric motor 37, a motor control regulator 38 in communication with the interior of the tank being employed to interrupt the operation of the motor when the pressure of the air within the tank 35 has reached a predetermined value. This arrangement maintains a continuous supply of air at a fixed pressure. Each of the tanks 35, 36 and 37 is in communication with the mixture manifold 32 by a separate line indicated generally at 39. Included in each of the lines is a diaphragm pressure regulator 41 and an adjustable needle valve 42 as shown. Each of the lines is also preferably provided with a pressure gage 43 disposed intermediate the tank and the respective pressure regulator and a second pressure gage 44 intermediate the pressure regulator and the mixture manifold 32.

A system suitable for firing the fuel mixture in the combustion chambers will be best understood by further reference to FIG. 5 in which each of the spark plugs 31 is shown electrically connected to the high tension terminal of the secondary winding of a spark coil 45 individual thereto. The primary windings of these coils are connected in series and to one terminal of a high capacity storage condenser 46, from whence the circuit is continued by way of the other terminal of the condenser, moving element 47 of a two-pole switch 48 and completed when element 47 engages switch contact 49. When switch element 47 is moved to engage switch contact 51 a circuit is closed to charge condenser 46 to a D.C. potential from induced current received from the secondary winding of spark coil 52 by way of rectifying element 53. The primary winding of the coil 52 is supplied by a rapidly fluctuating current from any suitable source such, for example, as by battery 54 and modulated by self-interruptions at contacts 55 of the spark coil, or alternatively, a motor driven high frequency generator may be employed in lieu of the battery arrangement illustrated.

On FIG. 6 is shown a complete electrical system for controlling at will the firing operations of the low frequency signal generator 10 from a control station on the towing vessel. In accordance with this system two relays are employed to control the scavenging and refueling operation, and the firing of the gaseous mixture within the combustion chambers respectively. The first of these relays is designated 56 and at the contacts 57 thereof applies a voltage to the solenoid operating elements 34 causing the solenoid valves 33 associated therewith, FIG. 3, to open and admit a flow of fuel mixture from the fuel mixing manifold into the combustion chambers, the pressure within the mixing manifold being sufficient to open the poppet valves 28 and move the flexible diaphragm 23 away from both the open ends of the combustion chambers and the exhaust ducts 22. The relay 56 is maintained operated for a period of time sufficient for the scavenging operation to take place and the combustion chambers to be filled with a fresh supply of the fuel mixture. As the relay releases, the solenoid valves are closed, the poppet valves return to their normally closed positions and the exhaust ducts 22 are closed. The winding of relay 56 is connected by conductor 58 within cable 59 to contact 61 of control switch 62 located on board the towing vessel. Cable 59, it will be understood, is provided with a waterproof sleeve or jacket of sufficient porosity, preferably, to impart a positive buoyancy thereto whereby the cable floats on the surface of the water. Alternatively the cable may be provided at intervals with floats or be supported and guided by the towing cable 13 in a manner to prevent fouling with the detection streamer.

When element 63 of control switch 62 is moved into engagement with contact 61 thereof a circuit is closed to operate relay 56 and maintain the relay operated until switch element 63 is disengaged from the contact.

The second relay of this control circuit is designated 64 and is employed for controlling the firing of the gaseous mixture within the combustible chambers as the relay operates. The relay winding is connected by conductor 65 to contact 66 of control switch 62 and operated as contact 66 is engaged by moving element 63 of the switch. Normally charged condenser 46, according to this embodiment of the invention, is connected to movable contact 67 of relay 64 and when contact 67 engages contact 68 as the relay operates the condenser discharges through the series connected primary windings of the spark coils 45 thereby firing all the spark plugs 31 simultaneously and causing the mixture within the combustion chambers to be ignited. If desired, a pair of distinctive electric signaling devices such as the lights 82—83 illustrated may be connected in parallel with the windings of relays 56 and 64 respectively as a visual indication to the operator on the towing vessel that the control signals were received at the barge.

On FIG. 7 is shown an alternative form of control in which but a single control circuit is employed between the towing vessel and the barge and to which is connected the winding of relay 71. This relay is of the polarized type having two moved positions and an intermediate neutral position of the movable contact element. The relay is connected by an insulated conductor 69, which may be enclosed within a cable such as the cable 59, for example, to the movable element of a 3-position switch 72 located on the towing vessel. With the control switch in one of the extreme moved positions current flows along conductor 69 in a direction to cause the armature contact 73 of the relay to be moved into engagement with contact 74 and thus operate relay 56 to initiate a scavenging and refueling operation. When the chambers have been scavenged and refueled, switch 72 is moved to the second or intermediate position between the contacts thereof thereby interrupting the current flow in conductor 69 and causing relay 71 to release and as armature contact 73 thereof moves into open position intermediate contacts 74 and 75 relay 56 releases.

As control switch 72 is moved into engagement with the other of its contacts, current flows in a reverse direction along conductor 69 causing contact 75 of relay 71 to be engaged by armature contact 73 thereby operating relay 64 and firing the gaseous mixture within the chambers.

Figure 8:
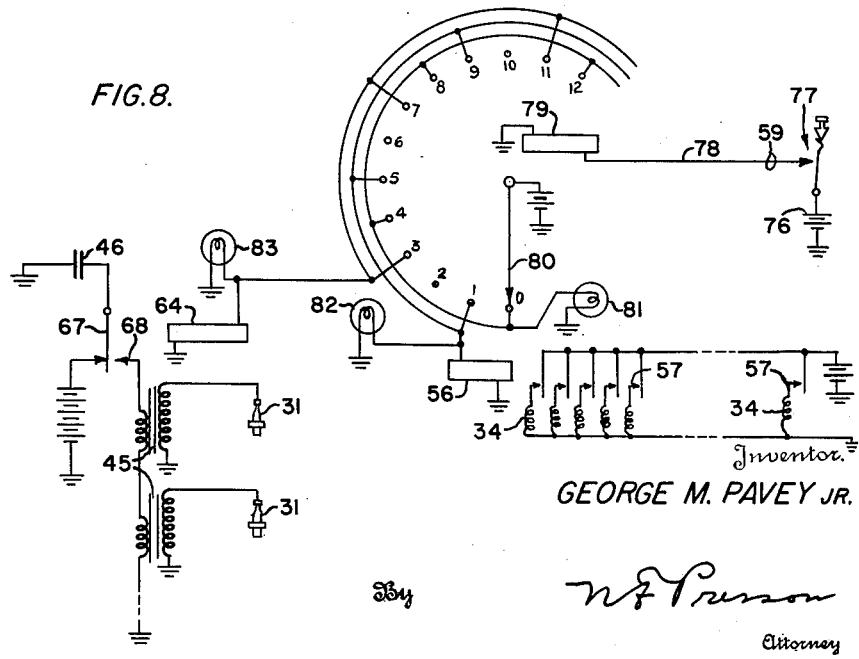
FIG. 8 is a circuit diagram on which is shown still another alternative arrangement for controlling the firing cycles of the low frequency signal generator at a distance.

While in the arrangement of FIG. 7 the single control circuit is referred to as comprising a single conductor 69, it will be understood that, as in the case of the other remote control circuits of FIGS. 6 and 8, a sea water return circuit between the barge and towing vessel is contemplated. This return circuit, however, may be made metallic, if desired by providing an additional conductor within the cable 59 extending between the barge and the towing vessel, if it is desired to eliminate certain undesirable coupling effects between this sea water current and the sensing element circuits of the detection streamer or seismic spread disposed beneath the barge.

There is shown on FIG. 8 still another system for controlling the filling, scavenging and firing cycles of the low frequency acoustic signal generating device 10 from the towing vessel. In accordance with this embodiment of the invention current impulses are applied singly and selectively at will from a source of voltage 76 by the operation of a push button or control switch 77 on the towing vessel to an insulated conductor 78 and thence to the operating magnet of a stepping switch mechanism 79. The stepping switch may be one of several well known types in which a wiper blade 80 is advanced step-by-step over a plurality of contacts in successive order, the contacts being arranged in a circular row about a switch bank. In the arrangement illustrated, contacts 1, 5, 9, etc. are connected together and to the operating winding of relay 56. In like manner contacts 3, 7, 11, etc. are connected together and to the operating winding of relay 64. Contacts 0, 4, 8, 12, etc. are connected together and preferably to a lamp 81. Lamp 82 may be connected in parallel with the winding of relay 56 and lamp 83 in parallel with the winding of relay 64.

With the switch wiper blade in the 0 or home position, lamp 81 is lighted and the system is in readiness for operation. A momentary operation of control switch 77 steps the switch 79 ahead to a position such that the wiper blade thereof engages contact 1 of the switch bank. As the blade leaves contact 0, the lamp 81 is extinguished.

As the wiper engages contact 1, relay 56 operates and lamp 82 is lighted as an indication of this condition. Relay 56 causes the solenoid operating elements 34 to be operated thereby scavenging and filling the combustion chambers with gaseous fuel. When sufficient time has elapsed for the scavenging and refueling operation to be completed, control switch 77 is again momentarily closed causing the wiper 80 of the stepping switch to be moved ahead into engagement with contact 2. As the wiper leaves contact 1, relay 56 releases thereby interrupting the refueling operation and lamp 82 is extinguished. The low frequency signal generator is now in readiness to be fired.

When control switch 77 is again actuated the wiper blade moves into engagement with contact 3, thereby operating relay 64 and firing the combustible charges within the chambers, lamp 83 lighting concurrently therewith. As wiper 80 moves ahead into engagement with terminal 4 of the stepping switch in response to the next succeeding actuation of control switch 77, the lamp 81 is again lighted as an indication that the stepping switch is now in a starting or home position in readiness for a new cycle of operations. Movement of wiper blade 80 away from contact 3 causes lamp 83 to be extinguished, relay 64 to be released and condenser 46 controlled thereby to be placed on charge in preparation for the next succeeding cycle of operations. Lamps 81, 82 and 83, it will be understood, are distinctively colored or otherwise designated and so disposed as to be clearly visible to the control operator on the towing vessel.

Figure 10:
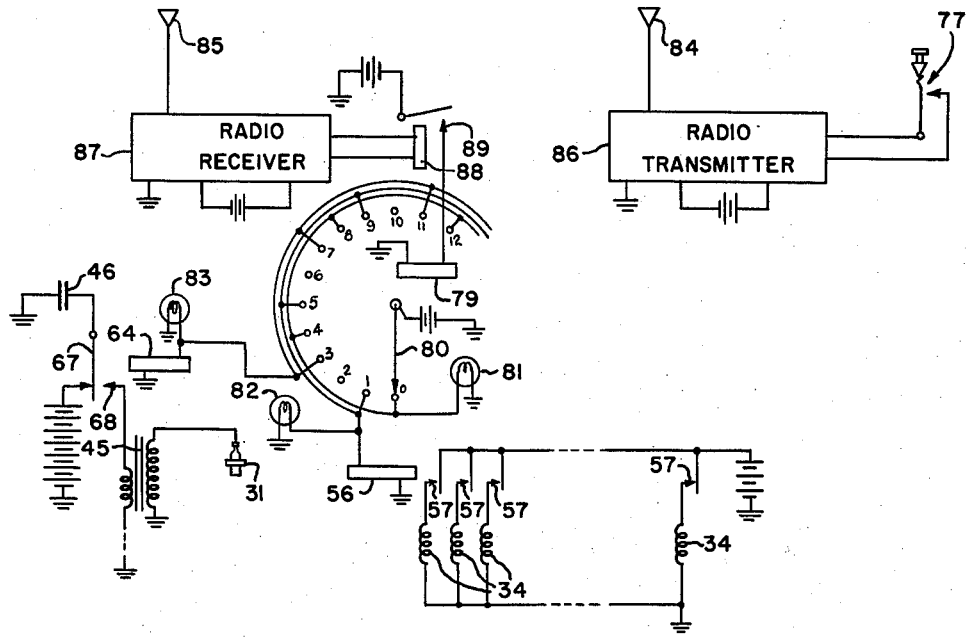

On FIGS. 9 and 10 is shown a system for operating the control system of FIG. 8 from a control station on the towing vessel without the necessity of establishing a metallic electrical connection therebetween. This may be achieved by a system of transmission of radio signals from a transmitting antenna 84 on the towing vessel to a receiving antenna 85 carried by the towed barge. As shown in greater detail on FIG. 10, the transmitting antenna 84 is operatively connected to a radio transmitter 86 carried by the towing vessel, the input of which is operatively connected to the push button or control key 77 in such manner that a single radio signal or impulse is transmitted from the antenna 84 corresponding to each operation of the control key.

On the barge is located a radio receiver 87 operatively connected to the receiving antenna 85 and tuned to the frequency of transmission of the radio transmitter. The output of the receiver is operatively connected to relay 88 in such manner that the relay is operated each time a radio signal impulse is received from the transmitting antenna 84. Relay 88 at contact 89 thereof applies an electrical impulse to the operating magnet 79 of the stepping switch causing the switch to be stepped ahead one step each time the control switch 77 is operated. The operation of the system is otherwise similar to the operation of the system of FIG. 8 and is thus achieved by radio control from the towing vessel.

There is shown on FIG. 11 an alternative arrangement for charging the combustion chambers with gaseous fuel mixture and for scavenging the same after the fuel has been burned. According to this arrangement the outlet from mixing chamber 32 is connected to the inlet of a manifold 101 by a duct having a normally closed solenoid actuated valve 102 therein, the winding of the actuating solenoid member being connected to contacts 1, 5, 9, etc. of stepping switch 79 of FIG. 8 in lieu of relay 56 whereby additional quantities of the gaseous mixture are admitted to manifold 101 and thence to the combustion chambers during the times when the stepping switch wiper is resting on these contacts. In this form of the invention the casting 26 within each of the chambers may be replaced by an iron plate 103 having an inlet port 104 and a tapped hole formed therein to receive the spark plug 31, FIG. 12. The plate 103 may have welded thereto as shown at port 104 an upstanding tube 105 for establishing communication between the interior of the chamber and the interior of manifold 101. In this arrangement the poppet valves are not required, flash back being prevented by a layer of fine wire gauze or mesh 106 arranged transversely within a coupling member 107 secured to the tube 105 intermediate the combustion chamber 21 and the manifold 101. Furthermore, if desired, the valve 102, FIG. 11, may be omitted and the gaseous mixture permitted to flow continuously throughout the system, the rate of flow being controlled by the needle valves 42 which would be set to settings such that the rate of flow and quantity of gaseous mixture flowing into the combustion chambers would be sufficient to scavenge the chambers and refill them with a fresh supply of mixture just prior to the time of the next shot. The rate of continuous gaseous flow would therefore be paced to the frequency of the firing of the gaseous fuel within the combustion chambers and only a small quantity of the fresh fuel mixture would bleed out of the vents or exhaust ducts 22. In such a case, the system may be fired by the operation of relay 64, as shown in FIG. 7, for example, in response to a signal received from the towing vessel over a single signal channel.

Whereas the invention has been described in considerable detail thus far with reference to a source of low frequency underwater seismic signals in which the signals are generated by the simultaneous operation of a number of closely spaced combustion chambers employing the burning of a gaseous mixture therein as an energy source, it will be understood that it is not so limited as the device is well adapted also to effect an additional improvement in the acoustic wave front shape of the seismic signal. The improvement resides in shaping the wave front into a better approximation of a plane wave and thereby rendering the seismic signal more directive in character. By shaping the wave front of the seismic signal in the manner now to be described, a seismic impulse is produced which is characterized by a rate of change of pressure and duration of pressure peak which correspond most favorably to seismic signal propagation. In seismic operations requiring deep penetration of the subaqueous geological formations, the frequencies may be in the octave between 25 and 50 cycles, while seismic operations of shallow character may require frequencies in the order of 250 and 500 cycles. For maximum efficiency it is desirable to avoid the generation of large energy components in the seismic wave outside the useful band of frequencies.

Figure 13:
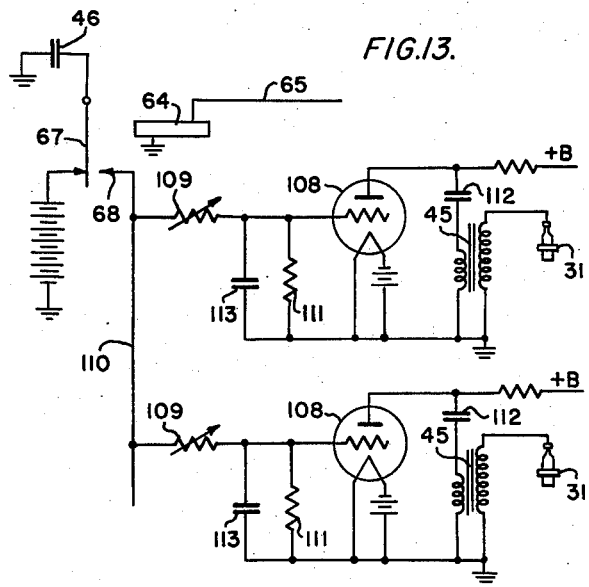
FIG. 13 is a circuit arangement for firing the fuel in the chambers in slightly time delayed relation in accordance with a predetermined firing order.

The shaping of the wave front is achieved by timing the firing of the combustion chambers in accordance with a predetermined firing order such that the detonation of certain zones are delayed momentarily with respect to other zones of the wave front set up by the low frequency acoustic seismic signal generating device 10. The means for effecting this modulation of the wave front will best be understood by reference to FIG. 13 on which is shown in diagrammatic form a circuit arrangement controlled by relay 64 for firing the fuel within the chambers 21 in quick successive order according to a predetermined zone pattern.

The arrangement comprises a plurality of electronic tubes 108, the grid of each tube being connected to a variable resistance 109 and thence to conductor 110, and normally biased beyond cut-off by a bias potential and a high resistor 111 connected between the grid and the cathode. The plate or anode of the tube is connected to a resistor to which B battery is continuously applied. The plate is also connected to a storage condenser 112, the other condenser connection extending to the primary winding of the spark coil 45 and thence to the grounded cathode of the tube. Condenser 112 is thus normally charged to the B battery potential of the tube. There is also provided a condenser 113 in parallel with resistance 111 and adapted to be charged to the grid potential necessary to trigger the associated tube 108 by current from condenser 46 as relay 64 operates.

The time required to charge condenser 113 to the trigger potential of the tube is controlled by the effective value of resistor 109 and thus by proper adjustment of resistors 109 the tubes may be made to fire in any predetermined sequential order, either singly or in groups, or both as desired.

As each tube 108 fires, condenser 112 associated therewith suddenly discharges through the primary winding of the spark coil 45 connected thereto thereby firing spark plug 31 and igniting the fuel within the associated combustion chamber. A low frequency seismic signal devoid of large energy components outside the useful band of frequencies thus is generated by the low frequency signal generating device 10 over a large area and the acoustic wave front shape of the signals may be changed at will to effect a close approximation of a plane wave, with improved directional characteristics by adjustment of the variable resistor elements 109 to the desired settings. The shaping of the wave shape front effects a considerable increase in the effectiveness of the acoustic impulse signals and is regarded as an important feature of this invention.

As shown on FIG. 1 the towing vessel is preferably provided with a streamlined strut 114 through which a length of pressure sensitive detector streamer generally indicated at 115 is adapted to be payed out. A grooved pulley 116 is provided at the lower end of the strut to guide and facilitate movement of the streamer as the streamer is payed out from a reel on board the towing vessel. It will be understood that the strut 114 may be pivotally secured to the vessel and provided with a depressor or hydroplane 117 secured thereto and adapted to maintain the lower end of the strut at a predetermined depth of submersion within the water while the vessel is under way, the depth of submersion preferably being controlled by the adjusted position of the depressor with respect to the strut although, if desired, a brace, guide lines or the like may be employed to fix the depth of submersion of the strut within the water.

A detection streamer particularly suitable for use with the present invention is disclosed and claimed in Patent 2,465,696, issued to L. C. Paslay on March 29, 1949, for Method and Means for Surveying Geological Formations, and comprises a plurality of piezoelectric microphones spaced at intervals within an oil filled flexible streamer and electrically connected to the seismic recording apparatus on the towing vessel. The specific gravity of the detection streamer is maintained to a value corresponding to the specific gravity of the surrounding water by a plurality of flotation chambers composed of "Lucite" or the like disposed at intervals within the streamer. The streamer, per se, forms no part of the present invention and for this reason, therefore, has not been illustrated on the drawings in detail. In practice, the lower end of the strut is adjusted to a depth greater than the depth of the barge and the tow line 13 interconnecting the barge and the towing vessel is of such length that the barge is positioned over a central longitudinal portion of the streamer or spread when the barge is being towed.

Whereas the low frequency acoustic signal generating device has been shown on the drawings as a barge having rows of four combustion chambers each disposed transversely therein, it will be understood that this has been done for the purpose of illustration only as in practice a barge of dimensions of 80' x 125', for example, having a bottom composed of concrete blocks or slabs, each having an area of the order of 20 x 20 feet would be provided with a much greater number of closely spaced combustion chambers, each chamber having a maximum diameter in the order of 18" to 24".

Furthermore, the proportions of butane and acetylene in the fuel mixture have been found to be reasonably critical for a particular wave shape, the other factors being the size and shape of the combustion chamber and the pressure of the gaseous mixture at the time of ignition. In general, it has also been found that an increase in the proportion of acetylene in the mixture increases the speed of the detonation of the wave front. The adjustable needle valves 42, FIGS. 5 and 11, are employed to control the proportions of the air, acetylene and butane components respectively of the combustible gaseous mixture entering the mixture manifold 32.

Although the preferred fuel mixture has been described with particularity as being composed of a mixture of air, acetylene and butane, the low frequency sound generator 10 is well adapted for use with other fuel mixtures suitable for the purpose, such for example, as a mixture of oxygen and hydrogen. When oxygen and hydrogen are employed as the constituents of the fuel mixture, no scavenging of the combustion chambers would be necessary. The rate of burning of the gaseous mixture and the duration thereof is controlled by the size and shape of the individual combustion chambers and the specific mixture of gas employed.

It should also be noted that whereas the invention has been illustrated on the drawings in connection with a single detection streamer or spread, it may, if desired, be employed advantageously with a plurality of detection streamers forming an array such, for example, as the array disclosed in my application for Firing Line for Subaqueous Geological Prospecting, Serial No. 529,451, filed August 10, 1955, now U.S. Patent No. 2,870,708, or the Paslay Patent 2,465,696, supra. It may also be employed with a streamlined deight composed of heavy material such, for example, as lead attached to the forward end portion of the detection streamer in the manner disclosed in the Paslay Patent 2,465,696, for maintaining the detection streamer well down within the water during a towering operation, in lieu of the strut 114 illustrated, the weight being lowered to the bottom just before the explosive shot occurs. By this arrangement the ultimate signal to noise ratio is obtained.

Without further analysis the foregong will so fully reveal the gist of this invention that others can, by applying current knowledge, readily adapt it for various applications without omitting certain features that, from standpoint of the prior art, fairly constitute essential characteristics of the generic or specific aspects of the invention, and therefore such adaptations should and are intended to be comprehended within the meaning and range of equivalency of the following claims.

What is claimed as new and desired to be secured by Leters Patent of the United States is:

1. In a system for under water seismic prospecting, in combination, a source of low frequency high pressure seismic signals comprising a barge, a massive bottom on said barge, said bottom provided with a plurality of open ended downwardly facing combustion chambers, flexible diaphragm means clamped to said bottom and normally enclosing the open ends of said chambers and in communication with the water subjacent thereto, means including a plurality of ducts connected to said chambers for filling said chambers with a gaseous explosive mixture, and means including a plurality of firing elements disposed respectively within the chambers for firing at will the mixture within the chambers, said bottom having a plurality of exhaust ports therein normally sealed by said diaphragm means and in communication with said chambers when the diaphragm means is suddenly forced downwardly by pressure sufficiently to unseal the exhaust ports as the mixture is fired.

2. The system according to claim 1 in which said mixture is composed of air, acetylene and butane.

3. A system according to claim 2 in which means connected to said ducts are provided for changing at will the proportions of air, acetylene and butane comprising said mixture.

4. In a system for subaqueous geophysical prospecting, the combination of a barge having a massive concrete bottom and means therein for generating low frequency high pressure seismic signals, said signal generating means comprising a plurality of open ended combustion chambers formed in said bottom in closely spaced relation and facing downwardly, a sheet of flexible material clamped to said bottom and normally sealing the open ends of said chambers, said bottom having a plurality of exhaust ports formed therein and normally sealed by said sheet in such manner that the ports are in communication with the interior of said chambers as the sheet is suddenly forced downwardly by an increase in the pressure within the chambers as combustion takes place therein, means including a plurality of ducts connected to said chambers for filling said chambers with an explosive mixture of gaseous fuel, and means including a plurality of firing elements disposed respectively within the chambers for firing said fuel within the chambers to effect combustion thereof and thereby generate said signals.

5. A system according to claim 4 in which said firing elements comprise a plurality of spark plugs, and means connected to said plugs and controlled at a distance for applying a potential to said plugs sufficiently high to cause firing thereof.

6. A system according to claim 4 including means structurally connected to said chambers for scavenging said chambers through said exhaust ducts when said combustion is complete.

7. A system according to claim 6 in which said filling and scavenging means for each of said combustion chambers includes a normally closed poppet valve carried by said bottom and adapted to be moved to open position by said mixture as the chamber is filled therewith.

8. A system for generating an underwater low frequency high pressure seismic signal comprising, in combination, a barge having a massive bottom composed of concrete and a plurality of open ended downwardly facing circular combustion chambers formed therein, flexible means clamped to said bottom for sealing the open ends of said chambers sufficiently to exclude water therefrom, a high pressure tank having a quantity of acetylene therein, a second high pressure tank having a quantity of butane therein, and a third high pressure tank filled with air under pressure, all of said tanks being carried by the barge, a mixing manifold connected to all of said tanks for receiving a flow of different fluids therefrom and causing said fluids to be mixed sufficiently to form an explosive mixture, means including a plurality of lines interconnecting said mixing manifold with said combustion chambers, a plurality of wire mesh screens, each of said screens being respectively disposed transversely in each of said lines for preventing flash back as the mixture within said combustion chambers is fired, and means including a plurality of spark discharge devices disposed within said combustion chambers and operable at will for firing said combustion mixture within said chambers thereby to generate said seismic signal.

9. A system according to claim 8 including manipulative means in the connections between the tanks and said mixing manifold for controlling the rate of flow of the fluids from each of the tanks to said mixing chamber.

10. A system according to claim 8 in which said means interconnecting the mixing manifold with the explosive chambers includes a second manifold to which the mixing manifold and the explosive chambers are connected.

11. A system according to claim 10 including a valve in said interconnecting means and electrically controlled at a distance for rendering the connection between the mixing manifold and said second manifold effective selectively at will.

12. A system for underwater seismic prospecting comprising a barge, a towing vessel connected to said barge for moving the barge through the water along a course, a massive bottom on said barge, said bottom having a plurality of open ended downwardly facing explosive chambers therein, flexible diaphragm means clamped to said bottom in sealing relation with the open ends of said chambers and in contact with the water subjacent thereto, means connected to said chambers for filling said chambers with a gaseous explosive mixture, means including a plurality of spark discharge devices disposed within said chambers for firing said mixture within the chambers, means structurally connected to said chambers for scavening the chambers after a firing operation, said scavenging, filling and firing means being operable at will in the order last named thereby to effect a firing cycle of operations, means providing a channel of communication interconnecting the barge with said vessel, means on the barge connected to said channel for effecting said cycle of operations in response to a pair of signals received over the channel and controlling respectively the operation of said filling and firing means, and means on the towing vessel and connected to said channel for applying at will said signals to the channel.

13. A system according to claim 12 in which said channel comprises an electrical cable interconnecting the barge with the towing vessel.

14. A system according to claim 13 including a stepping switch connected to said cable and having a wiper moveable to different settings in successive order in response to signals received therefrom, means including a relay connected to predetermined contacts of the bank terminals of said switch for filling and scavenging said explosive chambers as the terminals are engaged by the switch wiper, and means including a second relay connected to other predetermined contacts of the bank terminals for firing the mixture in said explosive chambers as said other contacts are engaged by the switch wiper.

15. A system according to claim 13 including a polarized relay on the barge connected to one conductor of said cable and having a moveable contact operable from an initial position into contact with either of two fixed contacts selectively in accordance with the polarity of the signal applied to said conductor, means on the towing vessel and connected to said conductor for applying signals of opposite polarity selectively to said conductor, means connected to one of said fixed contacts for scavenging and filling said explosive chambers, and means including a firing relay connected to the other of said fixed contacts for firing the explosive mixture within the chambers.

16. A system according to claim 12 in which said channel comprises a radio transmitter on the towing vessel and a radio receiver on the barge tuned thereto and having a control relay connected to the output of the receiver, and means including a stepping switch connected to the contacts of said control relay and operable to different settings selectively in accordance with the number of operations of the control relay for effecting said cycle of operations.

17. In a system for underwater seismic surveying, in combination, a source of low frequency high energy acoustic signals comprising a floating barge, a massive bottom for said barge having a plurality of downwardly extending open ended explosive chambers formed in mutual closely spaced relation therein, a flexible diaphragm sealing the open ends of said chambers for excluding water therefrom, means including a plurality of ducts connected to said chambers for filling said chambers with a gaseous explosive mixture, and means including a plurality of spark discharge devices disposed within said chambers for firing the mixture within the chambers in quick succession according to a predetermined firing order to control the pattern of the wave front of the signal generated by said source in a manner to increase the directional effect of the signal wave through the water.

18. A system according to claim 17 including means settable at will to different settings for changing the firing order, said last named means comprising a plurality of firing devices each of which is separately fired and includes a spark plug and spark coil connected thereto, a charged condenser, a firing circuit interconnecting the condenser with said spark coil and including in series therewith the anode and cathode elements of an electronic triode tube, a second condenser interconnecting the grid and cathode elements of said tube, said grid being normally biased beyond cut-off, a normally open charging circuit for said second condenser, a variable resistance element included in said charging circuit and settable to different values of resistance, and means including a switching device having a contact thereof connected to said resistance elements for applying a voltage simultaneously to each of said variable resistance elements sufficient to fire the tubes respectively associated therewith when the voltage of the second condenser connected thereto has increased to a predetermined value corresponding to the trigger voltage of the tube, the time required to fire each tube after the voltage has been applied simultaneously to each of said resistor elements being controlled by the set value of the resistance element associated therewith.

References Cited in the file of this patent

UNITED STATES PATENTS

| | | |
|---|---|---|
| 1,500,243 | Hammond | July 8, 1924 |
| 2,480,626 | Bodine | Aug. 30, 1949 |
| 2,556,299 | Scott | June 12, 1951 |
| 2,729,300 | Paslay et al. | Jan. 3, 1956 |
| 2,745,507 | Bodine | May 15, 1956 |
| 2,766,837 | McCollum | Oct. 16, 1956 |
| 2,772,746 | Merten | Dec. 4, 1956 |

FOREIGN PATENTS

| | | |
|---|---|---|
| 18,025 | Great Britain | 1908 |